United States Patent [19]
Cesar

[11] 4,308,682
[45] Jan. 5, 1982

[54] HUMANE ANIMAL TRAP

[76] Inventor: Edward Cesar, P.O. Box 334, Granum, Alberta, Canada, T0L 1A0

[21] Appl. No.: 172,963

[22] Filed: Jul. 28, 1980

[30] Foreign Application Priority Data

Aug. 7, 1979 [CA] Canada ................................. 333316

[51] Int. Cl.³ .......................................... A01M 23/24
[52] U.S. Cl. .......................................... 43/88; 43/77
[58] Field of Search .................. 43/77, 78, 58, 88, 89, 43/90, 91, 92, 93, 94, 95, 96

[56] References Cited

U.S. PATENT DOCUMENTS

| | | | |
|---|---|---|---|
| 1,342,328 | 6/1920 | Enos | 43/77 |
| 1,421,610 | 7/1922 | Suehla | 43/88 |
| 2,123,789 | 7/1938 | Miller | 43/88 X |
| 2,123,955 | 7/1938 | Oberle | 43/77 |
| 2,333,828 | 11/1943 | Taylor | 43/92 |
| 2,805,513 | 9/1957 | Long | 43/88 |
| 4,033,067 | 7/1977 | Kuehl | 43/92 X |

*Primary Examiner*—Stephen G. Kunin
*Assistant Examiner*—Robert P. Olszewski
*Attorney, Agent, or Firm*—George H. Dunsmuir

[57] ABSTRACT

A humane animal trap includes a casing defined by upper and lower box-like sections, which are hingedly interconnected for telescoping together to a set position; springs biasing such sections apart to a sprung position; a latch mechanism for holding the upper and lower sections together in the set position; a pair of jaws hingedly mounted in the top of the upper section and connected to a trigger which is actuated by one of the jaws when an animal steps on the jaws for causing the latch mechanism to release the upper section, whereby the upper section moves upwardly relative to the lower section and the leg of the animal moves downwardly between the jaws; springs biasing the jaws to the closed position where resilient opposed edges of the jaws retain the leg of the animal without damaging the leg; and gates which slide partly together above the jaws when the trap is sprung to limit access to such jaws, whereby once trapped an animal cannot readily gain access to the jaws and escape.

5 Claims, 9 Drawing Figures

HUMANE ANIMAL TRAP

BACKGROUND OF THE INVENTION

The invention relates to an animal trap, and in particular to a humane trap for animals such as wolves and smaller animals.

The prior art discloses several animal traps of generally the same type as that provided by the present inventor. Examples of such prior art are U.S. Pat. Nos. 1,342,328, issued to A. Enos on June 1, 1920; 1,475,871, issued to F. H. Phillips on Nov. 27, 1923; 2,123,955, issued to J. Oberle on July 19, 1938; 2,805,513, issued to C. G. Long on Sept. 10, 1957 and 4,033,067, issued to J. Kuehl on July 5, 1977. Most of the traps disclosed by such patents include jaws in the form of plates, which are spring biased to the closed position. However, some of the traps, e.g. the Enos, Phillips and Oberle devices are not humane because the jaws have serrated edges for penetrating the leg of an animal. Others of the traps such as the Long apparatus are relatively complicated, including complex linkages and spring devices for operating the jaws.

The object of the present invention is to provide a relatively simple, humane animal trap, which is easy to produce because it includes no complicated parts.

SUMMARY OF THE INVENTION

Accordingly, the present invention relates to an animal trap comprising a casing, said casing including opposed upper and lower sections open at their bottom and top ends, respectively, whereby the sections can be telescoped together into a set position; anchor means for anchoring said casing in one location; hinge means interconnecting the upper and lower sections, whereby the sections can move relative to each other into a spaced apart relationship when the trap is sprung; first spring means biasing said sections to the sprung position; latch means for locking said sections in the set position; jaw means pivotally mounted in said upper section defining the top of said upper section; second spring means biasing said jaw means to the closed position, in which the jaw means forms a continuous top surface on the casing; trigger means for actuation by said jaw means to release said latch means, whereby the spring means moves said sections rapidly apart from the set to the sprung position; said jaw means including opposed, resilient free edges for gripping the leg of an animal, whereby, when an animal steps on said jaw means, the jaw means opens permitting entrance of the paw of the animal into the trap, actuating said trigger means to release the latch means causing the upper section to move upwardly on the leg of the animal, and said second spring means biases said jaw means to the closed position to resiliently engage the leg of the animal above the paw so that removal of the leg from the trap by pulling is prevented.

BRIEF DESCRIPTION OF THE DRAWING

The invention will now be described in greater detail with reference to the accompanying drawings which illustrate a preferred embodiment of the invention, and wherein.

DESCRIPTION OF THE PREFERRED EMBODIMENT(S)

APPARATUS

Figure 1:
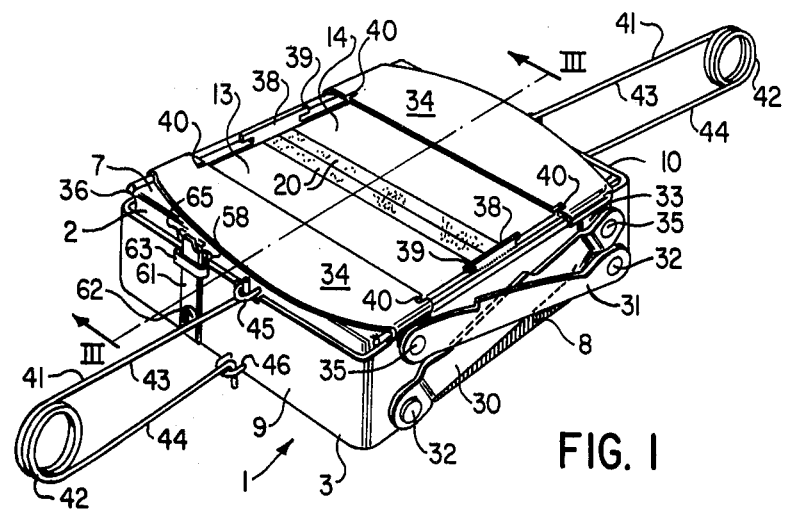
FIG. 1 is a perspective view from above and one end of a preferred embodiment of the animal trap of the present invention in the set position.
Figure 2:
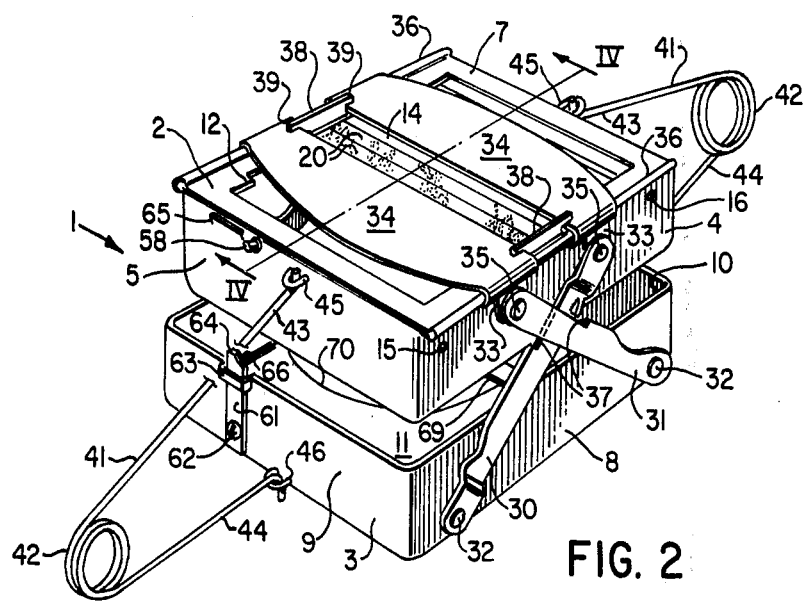
FIG. 2 is a perspective view similar to FIG. 1 showing the trap in the spring position, with the jaws closed.

With reference to FIGS. 1 to 4, the trap of the present invention includes a casing generally indicated at 1. The casing 1 is defined by upper and lower sections 2 and 3, respectively which together in the set position (FIG. 1) define a generally parallelepipedic structure. In the set position, the upper section 2 is telescoped almost completely into the lower section 3. The upper section 2 includes side walls 4, end walls 5 and 6, and a top wall 7, wall 5 being preferably provided with a taper to substantially eliminate binding when engaged with lower section 3. The lower section 3 is defined by substantially vertical side walls 8, end walls 9 and 10, and a substantially planar wall 11.

The top wall 7 of the upper section 2 includes a large opening 12 defined by the top wall 7, which extends inwardly a short distance around the periphery of the upper section. When the trap is in the set position (FIGS. 1 and 3), the opening 12 is closed by jaws 13 and 14, which are pivotally mounted on rods 15 and 16 extending through downwardly extending flanges 17 on each side of the jaws 13 and 14 and into the side walls 4 of the upper section 2 near the ends thereof.

Each jaw 13 and 14 (FIGS. 3 and 4) includes the flanges 17, a top plate 18 and a downwardly extending flange 19 at its inner end integral with such top plate 18 and extending between the side flanges 17. A strip of soft rubber 20 is attached to the opposed outer surfaces of the flanges 19, so that the inner ends of the jaws resiliently grip the leg of an animal (as described in greater detail hereinafter).

Figure 3:
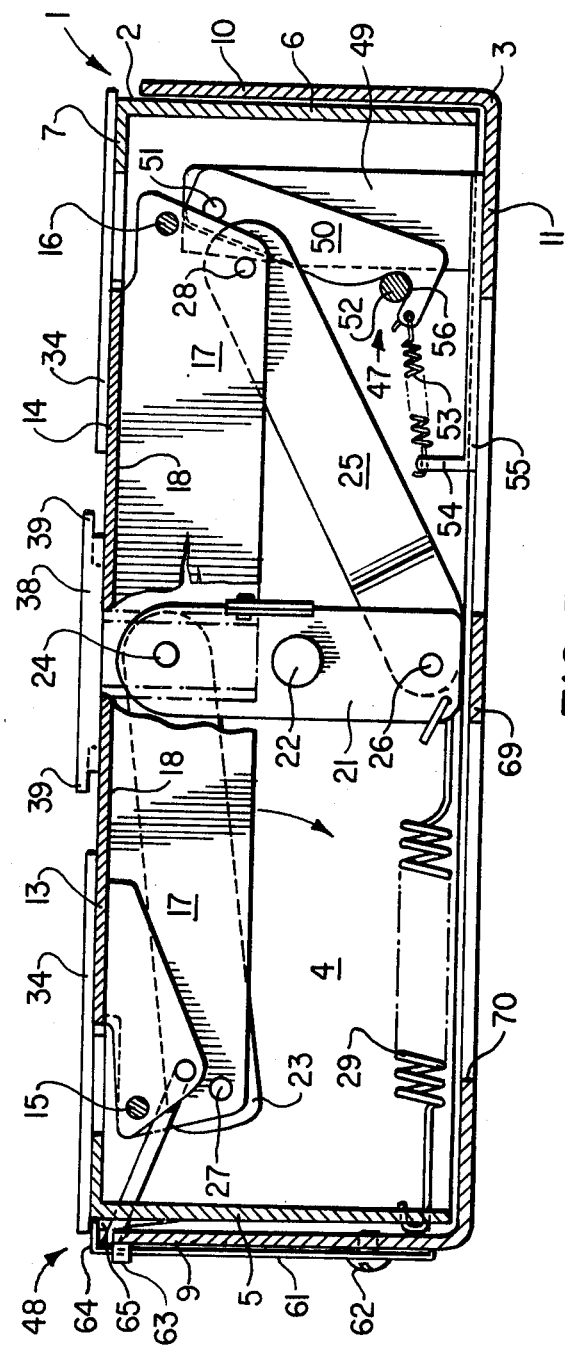
FIGS. 3 and 4 are cross-sectional views of the trap taken generally along lines III—III and IV—IV, respectively of FIGS. 1 and 2, FIG. 4 showing the jaws open.
Figure 4:
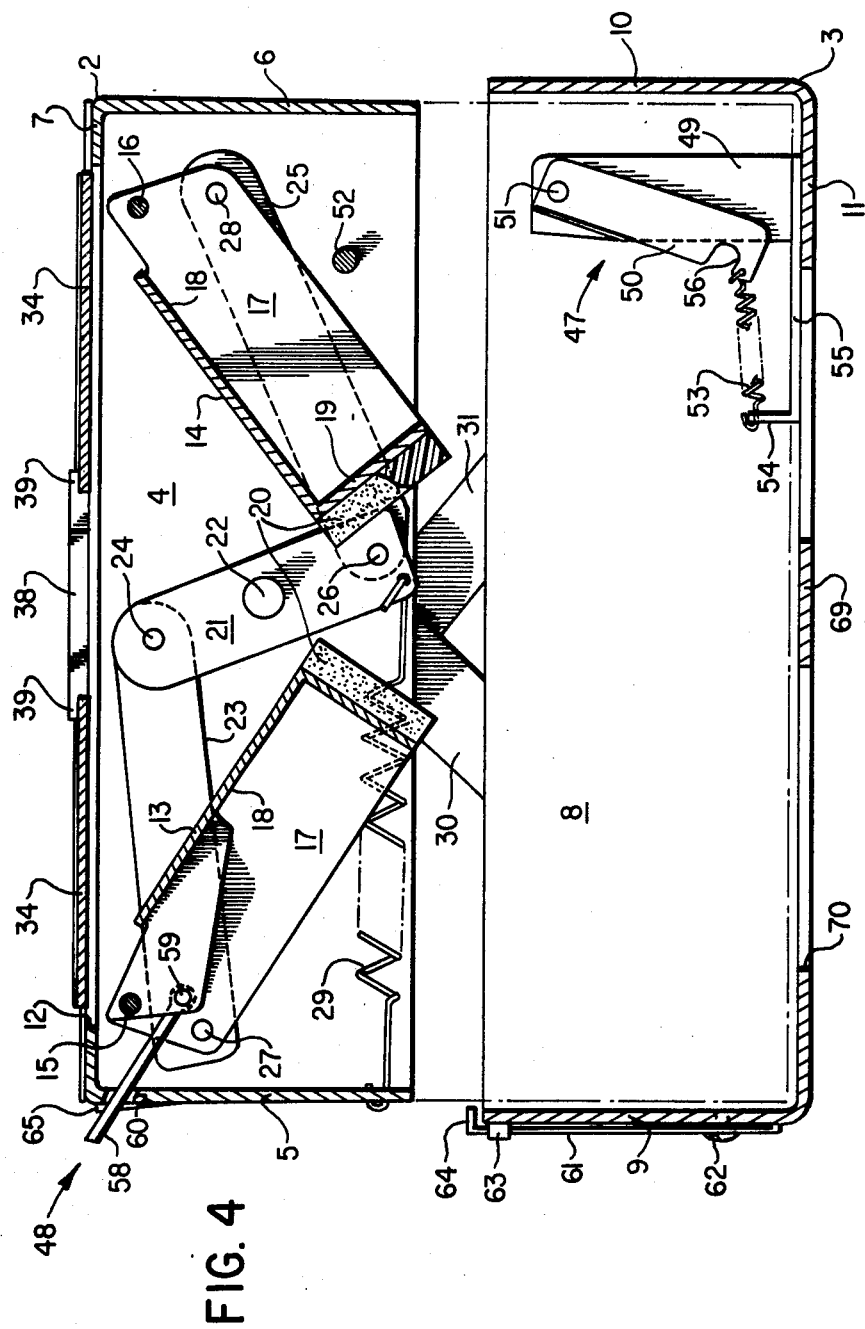

The jaws 13 and 14 are biased closed by a pair of linkage mechanisms (one shown in FIGS. 3 and 4), each of which includes a central lever 21 pivotally mounted at its centre on a pin 22 extending inwardly from the centre of one side wall 4 of the upper section 2 of the casing 1. One end of an arm 23 is pivotally connected to the top end of the lever 21 by a pin 24, and one end of an arm 25 is pivotally connected to the bottom end of the lever 21 by a pin 26. The other ends of the arms 23 and 25 are pivotally connected to the outer ends of the flanges 17 by pins 27 and 28, respectively. The lever 21 is biased to the vertical position, i.e. to the position in which the jaws 13 and 14 are closed by a helical spring 29 connecting the bottom of the lever 21 to one end wall 5 of the upper section 2 of the casing 1. By pulling on the bottom end of the lever 21, the spring 29 biases the inner ends of the jaws 13 and 14 together (FIG. 3). When the jaws 13 and 14 are forced open by a slight pressure such as that applied by the paw of an animal, pivot points of the arms 23 and 24 defined by the pins 27 and 28 move through arcs towards the end walls 5 and 6 of the upper section 2. Thus, the lever 21 is caused to rotate around the pin 22 (in a counterclockwise direction as seen in FIGS. 3 and 4). As soon as the pressure of the jaws 13 and 14 is released, the spring 29 rotates the lever 21 in a clockwise direction closing the jaws. As will be appreciated, an additional spring 29 can be incorporated if required to operably assist in the biasing of the linkage mechanism on the opposite side of upper section 2.

The upper and lower sections 2 and 3 of the casing 1 are hingedly interconnected by a pair of hinges 30 and 31 (FIGS. 1 and 2—only one pair shown) on each side of the casing. The hinges 30 and 31 are defined by metal strips, the bottom ends of which are pivotally connected to the ends of the side walls 8 of the lower section 3 by pins 32. The top ends of the hinges 30 and 31 are pivotally connected to downwardly extending flanges 33 on the ends of gates 34 by pins 35. The gates 34 are provided on the hinges 30 and 31 for limiting upward movement of the upper section 2 of the casing 1 relative to the lower section 3 in the sprung position. The detents 37 are in the form of lugs on each hinge 30 and 31 for engaging grooves on the other hinge. Inward or together movement of the gates 34 is limited by stops 38 extending upwardly from the centre of each side of the top wall 7 of the upper section 2. The stops 38 are generally T-shaped posts against which the gates 34 abut in their togethermost positions. Arms 39 on the stops 38 mate with slots 40 near each end of the gates 34 for limiting movement of the gates towards each other when the trap is in the sprung position.

The upper and lower sections 2 and 3 of the casing 1 are normally biased apart, i.e. into the open or sprung position (FIGS. 2 and 4) by a pair of springs 41. Each spring 41, in the tensioned condition is generally V-shaped with a coil 42 at its outer end and a pair of arms 43 and 44 have hooks at their inner ends for connecting the spring to eyes 45 and 46 on the end walls 5, 6 and 9, 10, respectively of the upper and lower sections 2 and 3. In order to maintain the trap in the set position (FIGS. 1 and 3) with the upper and lower sections 2 and 3 telescoped together, latch means have to be provided. In this preferred embodiment, the latch arrangement is depicted in the form of a catch mechanism, generally indicated at 47, provided at one end of the casing 1, and a trigger device generally indicated at 48 is provided at the other end of the casing.

In this particular form, catch mechanism 47 includes a post 49 extending upwardly from the base 11 of the lower sections 3 of the casing 1. The top end of a lever arm 50 is pivotally connected to the top end of the post 49 by a pin 51. When the trap is in the set position (FIGS. 1 and 3), the arm 50 is biased against a lug 52 extending inwardly from one side 4 of the upper section 2 by a helical spring 53. The spring 53, which is mounted on a post 54 on base 55 of the post 49, biases the arm 50 against the lug 52, so that the lug enters a groove 56 in the arm.

Figure 5:
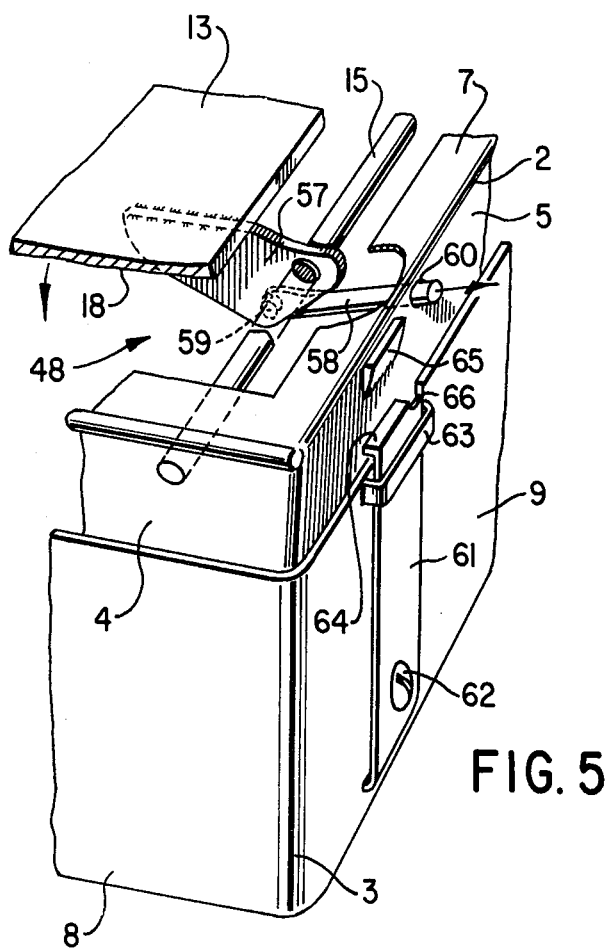
FIG. 5 is a perspective view from above and one end of a portion of the trap of FIGS. 1 to 4, with parts omitted.
Figure 9:
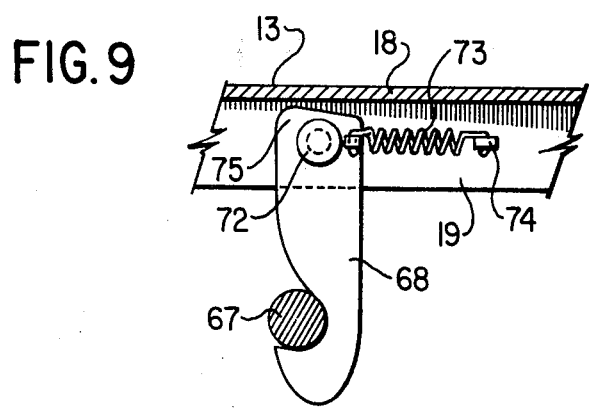
FIG. 9 is a cross-sectional view of portions of one jaw and the base of the trap taken generally along the line IX—IX of FIG. 6.
Figure 6:
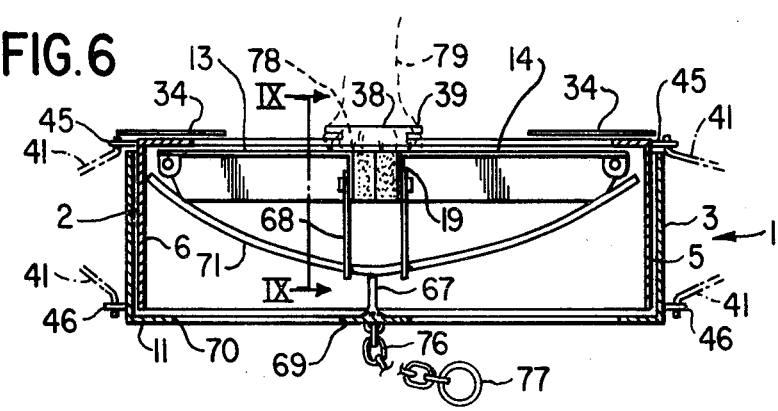
FIGS. 6 to 8 are schematic, cross-sectional views of the trap of FIGS. 1 to 5 in the set, partly sprung and sprung positions, in that order.
Figure 7:
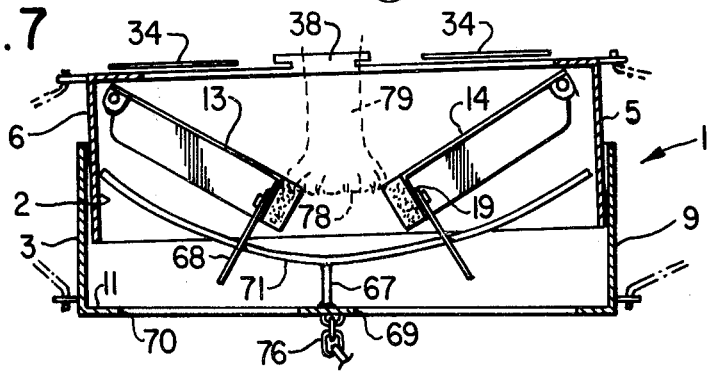

The trigger device 48, which is best illustrated in FIG. 5, is actuated during movement of the jaw 13 to the open position. The trigger device 48 includes a generally triangular lever 57 pivotally mounted at one end of the rod 15 extending between the sides 4 of the upper section 2 of the casing 1. The other end of the lever 57 is fixedly connected to the outer bottom end of the jaw 13. One flattened end of a rod 58 is pivotally connected to the bottom end of the lever 57 beneath and inwardly of the rod 15 by a pin 59. The rod 58 extends outwardly through an aperture 60 in the top of the end wall 5 of the upper section 2 of the casing 1. Thus, the rod 58 slides in the aperture 60 as the jaw 13 moves beneath the closed and open positions. A catch in the form of a thin flexible metal bar 61 is mounted on the end wall 9 of the lower section 3 of the casing 1 by means of a screw 62. The bar 61 extends upwardly through a generally U-shaped bracket 63 on the top end of the end wall 9. The top end of the bar 61 bends inwardly to form a hook 64 for engaging a ledge 65 extending outwardly from the end wall 5 of the upper section 2 beside the aperture 60 when the trap is in the set condition. The bar 61 is wide enough to overlap the aperture 60. The hook 64 on the side of the aperture 60 has a cut away portion 66, so that the hook does not engage the outer end of the rod 58 during movement of the upper and lower sections 2 and 3 from the set to the sprung positions. The opening in the bracket 63 is sufficiently wide that the bar 61 can move slightly toward and away from the end wall 9 to permit disengagement of the ledge 65 by the hook 64.

As illustrated in FIGS. 6 to 9, in the set position of the trap, the upper section 2 is centered transversely in the lower section 3 of the casing 1 by a guide bar 67 and hooks 68. The guide bar 67, extends upwardly from the centre of a cross-bar 69 spanning an opening 70 in the bottom wall 11 of the lower section 3. The bar 67 bends towards each of end walls 9 and 10 of the lower section 3, curving upwardly to a rounded outer end 71. In the set position of the trap, the bar 67 is engaged by the hooks 68 which extend downwardly from the interior surface of the flange 19 of jaws 13 and 14. The hooks 68 (FIG. 9) are pivotally mounted on each flange 19 by means of pins 72. Helical springs 73 extending between the top end of the hooks 67 and lugs 74 on the flanges 19 resiliently urges hooks 68 against the bar 67. Movement of the hooks 68 beyond the position in which the upper section 2 is centered in the lower section 3 is limited by top end 75 of each hook which bears against the top plate 18 of the jaws 13 and 14.

The trap is conveniently held in position by means of a chain 76 extending downwardly from the centre of the cross-bar 69, with a hook 77 at its outer end for attaching the chain and casing to a stake or tree (not shown).

OPERATION

Referring principally to FIGS. 5 to 9, the operation of the apparatus described hereinbefore will now be set out in detail.

Figure 8:
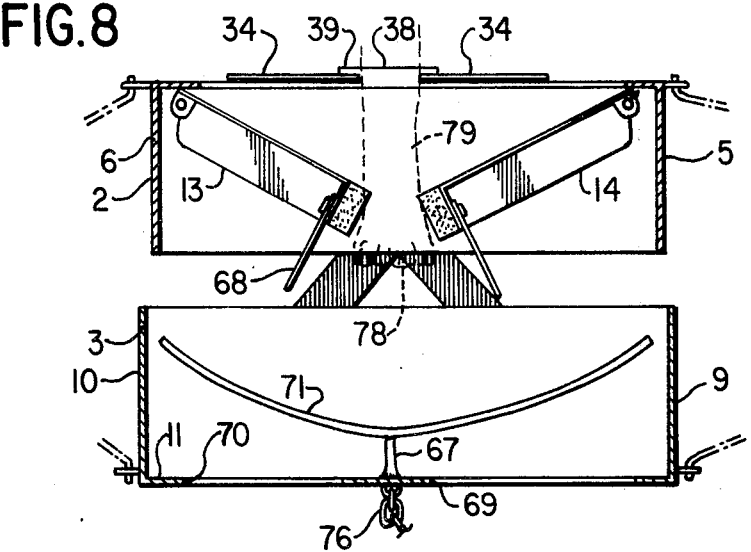

With the trap in the set position (FIG. 6), for example buried under leaves in a slight depression in the ground, when an animal steps on the jaws 13 and 14, the weight of the paw 78 and leg 79 are sufficient to cause the jaws 13 and 14 to open. As soon as the jaw 13 starts to open, the outer end of the rod 58 pushes against the top end of the bar 61 to move the latter outwardly releasing the hook 64 from the ledge 65. Thus, the end of the upper section 2 carrying the rod 58 begins to move upwardly (FIG. 7), such upper section 2 momentarily rotating around the lug 52. After rotating a short distance, the lug escapes from the groove 56 in the arm 50, and the other end of the upper section is released, permitting the upper section 2 to rise unimpeded to the sprung position (FIG. 8). With strong springs 41, all of the foregoing action occurs virtually instantaneously. Watching the trap being sprung, a person would not notice the tilting of the upper section 2 relative to the lower section 3 at the beginning of the upward movement of the upper section. The upper section 2 literally jumps out of the lower section 3 of the casing 1. During initial upward movement of the upper section 2, the upper and lower sections 2 and 3 are maintained in alignment by the hooks 68 and guide bar 67.

As the upper section moves upwardly, the upper ends of the hinges 30 and 31 move together and draw the gates 34 towards each other. In the fully sprung position the gates 34 abut against the stop 38 leaving a narrow opening. The opening is so narrow that the animal cannot insert another paw or his snout into the trap to open the jaws 13 and 14, and release the paw and leg engaged by the jaws.

In order to reset the trap, it is merely necessary to apply pressure on the upper section 2 forcing it into the lower section 3. As the upper section 2 moves into the lower section 3, the hooks 68 engages the bar 67 to centre the upper section 2 in the lower section, the lug 52 comes to rest in the groove 56 in the arm 50, and the hook 64 of the bar 61 engages the ledge 65. Thus, the upper section 2 is releasably locked in the lower section 3.

It will be appreciated that the gates 34 are not absolutely essential, since they merely reduce the risk of the animal escaping from the trap.

There has thus been described a relatively simple, humane animal trap.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is further understood that the form of the invention herewith shown and described is to be taken as the presently preferred embodiment. Various changes may be made in the shape, size and general arrangement of components, for example equivalent elements may be substituted for those illustrated and described herein, parts may be used independently of the use of other features, all as will be apparent to one skilled in the art after having the benefits of the description of the invention and the appended claims.

What I claim is:

1. An animal trap comprising a casing, said casing including opposed upper and lower sections open at their bottom and top ends, respectively, whereby the section can be telescoped together into a set position; anchor means for anchoring said casing in one location; hinge means interconnecting the upper and lower sections, whereby the sections can move relative to each other into a spaced apart relationship when the trap is sprung; first spring means biasing said sections to the sprung position; latch means for locking said sections in the set position; jaw means pivotally mounted in said upper section defining the top of said upper section; second spring means biasing said jaw means to the closed position, in which the jaw means forms a continuous top surface on the casing; trigger means for actuation by said jaw means to release said latch means, whereby the spring means moves said sections rapidly apart from the set to the sprung position; said jaw means including opposed, resilient free edges for gripping the leg of an animal, whereby, when an animal steps on said jaw means, the jaw means opens permitting entrance of the paw of the animal into the trap, actuating said trigger means to release the latch means causing the upper section to move upwardly on the leg of the animal, and said second spring means biases said jaw means to the closed position to resiliently engage the leg of the animal above the paw so that removal of the leg from the trap by pulling is prevented.

2. An animal trap according to claim 1, including gate means, said gate means comprising a pair of opposed plates slidably mounted on the top surface of said upper section of the casing above the jaw means for movement between an open spaced apart position when the trap is set and a closed position against the leg of the animal when the trap is sprung to impede access to said jaw means.

3. An animal trap according to claim 2, including means connecting said gate means to said hinge means, whereby movement of the trap between the set and sprung positions causes corresponding movement of the gate means between the open and closed positions.

4. An animal trap according to claim 1, wherein said latch means includes a catch mechanism at one end of said casing releasably interconnecting one end of said top and bottom sections; and a trigger device incorporating said trigger means releasably interconnecting the other end of said top and bottom sections of the casing.

5. An animal trap according to claim 4, wherein said trigger device includes a ledge at the top of one end wall of said upper section, a resilient hooked bar on one end wall of said lower section for releasably engaging said ledge; lever means mounted on sais jaws means; and a rod connected to said lever means for disengaging said bar from said ledge during movement of said jaw means from the closed to the open position.

* * * * *